United States Patent
Jiang et al.

(10) Patent No.: US 12,463,879 B2
(45) Date of Patent: Nov. 4, 2025

(54) TAG-BASED PACKET CAPTURE AND QUERY

(71) Applicant: Arista Networks, Inc., Santa Clara, CA (US)

(72) Inventors: Kanzhe Jiang, Los Altos Hills, CA (US); Zhao Dong, Sunnyvale, CA (US); Sandip Shah, Fremont, CA (US); Shunjia Yu, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 51 days.

(21) Appl. No.: 18/616,699

(22) Filed: Mar. 26, 2024

(65) Prior Publication Data

US 2025/0310219 A1     Oct. 2, 2025

(51) Int. Cl.
*H04L 43/028* (2022.01)
*H04L 12/46* (2006.01)

(52) U.S. Cl.
CPC ........ *H04L 43/028* (2013.01); *H04L 12/4633* (2013.01)

(58) Field of Classification Search
CPC . H04L 12/4633; H04L 43/026; H04L 43/028; H04L 43/04; H04L 43/0829; H04L 43/0852; H04L 43/12; H04L 43/16; H04L 45/28; H04L 63/1425; H04L 65/1069; H04W 24/08
See application file for complete search history.

(56) References Cited

U.S. PATENT DOCUMENTS

| | | | |
|---|---|---|---|
| 2004/0213232 A1* | 10/2004 | Regan | H04L 45/50 370/432 |
| 2014/0280887 A1* | 9/2014 | Kjendal | H04L 43/12 709/224 |
| 2020/0076597 A1* | 3/2020 | Higgins | H04L 9/0894 |
| 2021/0218673 A1* | 7/2021 | Ma | H04L 43/12 |
| 2023/0308458 A1* | 9/2023 | Varsanyi | H04L 63/166 |
| 2024/0214294 A1* | 6/2024 | Miriyala | H04L 43/08 |

FOREIGN PATENT DOCUMENTS

WO    WO-2014153176 A1 *    9/2024    ......... H04L 63/1425

* cited by examiner

*Primary Examiner* — Christopher Biagini
(74) *Attorney, Agent, or Firm* — Fountainhead Law Group, PC (57) ABSTRACT

A framework for facilitating the capturing and querying of network traffic (packets) is provided. In one set of embodiments, the framework enables the assignment of tags to sets of related network device interfaces. For example, a tag T1 may be assigned to a set of network device interfaces that carry traffic for an application or service A1, a tag T2 may be assigned to a set of network device interfaces that carry traffic for an application or service A2, and so on. The framework further enables the use of these tags for provisioning packet capture sessions and for querying the resulting captured packets.

20 Claims, 6 Drawing Sheets

TAG-BASED PACKET CAPTURE AND QUERY

BACKGROUND

Packet capture, also known as PCAP, is the process of mirroring and storing network packets that pass through a computer network. Upon being stored, the captured packets can be queried and analyzed for various purposes (e.g., network performance monitoring, security analysis, troubleshooting, etc.).

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure are directed to a framework for facilitating the capturing and querying of network traffic (packets). In one set of embodiments, the framework enables the assignment of tags to sets of related network device interfaces. For example, a tag T1 may be assigned to a set of network device interfaces that carry traffic for an application or service A1, a tag T2 may be assigned to a set of network device interfaces that carry traffic for an application or service A2, and so on. The framework further enables the use of these tags for provisioning packet capture sessions and for querying the resulting captured packets.

1. Example Environment and Solution Overview

Figure 1:
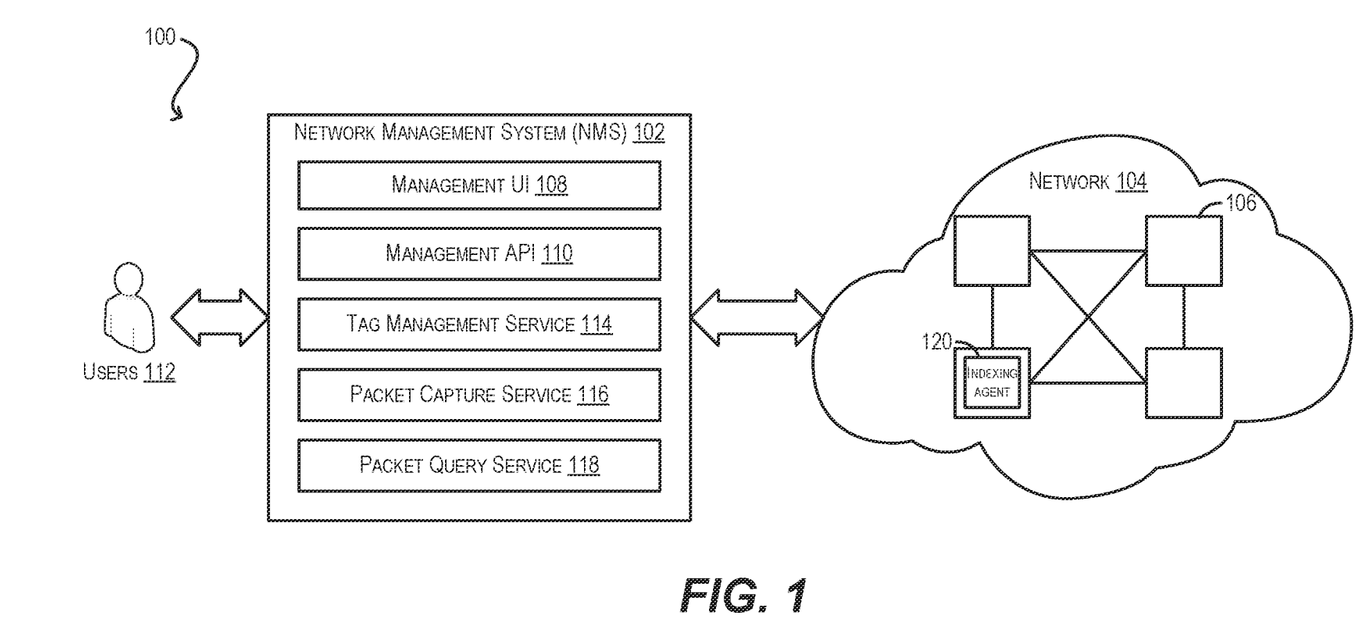
FIG. 1 depicts an example environment in accordance with certain embodiments of the present disclosure.

FIG. 1 is a simplified block diagram of an example environment 100 that implements the framework of the present disclosure according to certain embodiments. As shown, environment 100 includes a network management system (NMS) 102 that is communicatively coupled with a network 104 comprising a plurality of network elements 106. Network elements 106 can include endpoints (e.g., computer systems, storage components, etc.) that send and receive data in the form of network packets over network 104, as well as network devices (e.g., switches, routers, etc.) that forward and/or process the packets sent and received by the endpoints.

Generally speaking, NMS 102 is a system that provides centralized configuration, management, and monitoring of computer networks like network 104. To that end, NMS 102 includes, among other things, a management user interface (UI) 108 and a management application programming interface (API) 110 that are exposed to a group of users 112 associated with network 104. Users 112 can interact with UI 108 and/or API 110 to perform various management tasks with respect to network 104, such as retrieving information regarding the statuses of network elements 106, changing their configurations/settings, deploying new network elements, decommissioning existing network elements, and so on.

In some scenarios, a user associated with network 104 may wish to capture network packets pertaining to a particular application or service in network 104 and query (retrieve) the captured packet data. For example, the user may be investigating a problem affecting an email service and may wish to capture and review the network traffic sent or received by instances of the email service in order to troubleshoot the problem.

Traditionally, this packet capture process requires the user to (1) manually identify all network device interfaces that carry traffic pertaining to the application/service of interest and (2) manually configure the corresponding network devices in network 104 to mirror the traffic on those interfaces to a packet capture destination (e.g., a recorder node). In modern scale-out architectures where application/service instances can be deployed on multiple servers (and in some cases, can be dynamically created and removed on demand), this approach is cumbersome and often impractical.

Further, existing mechanisms for querying captured packet data only support query criteria that correspond to standard Layer 2 and Layer 3 packet header fields, such as source Internet Protocol (IP) address, destination IP address, source port, destination port, and so on. Accordingly, with these existing mechanisms there is no easy way to query captured packets based on higher-level attributes.

To address the foregoing and other related issues, environment 100 of FIG. 1 implements a novel packet capture/query framework comprising a tag management service 114, a packet capture service 116, and a packet query service 118 running on NMS 102. The framework also includes an indexing agent 120 running on each network element 106 of network 104 that is designated to serve as a packet capture destination. For example, in one set of embodiments indexing agent 120 may run on the recorder nodes of network 104, where a recorder node is a type of device that is designed to receive and store captured packet data. Alternatively or in addition, indexing agent 120 may run on one or more network devices (e.g., switches or routers) of network 104.

At a high level, tag management service 114 enables users 112 of NMS 102 to create and assign unique tags (labels) to sets of network device (e.g., switch) interfaces in network 104 that share common attributes. For instance, in the example above where a user wishes to capture network packets pertaining to an email service, the user can create and assign the tag "role: email" to the set of network interfaces in network 104 that carry network traffic for (or in other words, are connected to) instances of that email service. In various embodiments, the users interacting with tag management service 114 can be humans (e.g., administrators of network 104) or automated agents (e.g., software programs or scripts). In the case of a human, the user can manually determine the tag assignments based on his/her understanding of network 104. In the case of an automated agent, the user can automatically determine (and periodically update) these tag assignments in a programmatic manner, potentially based on information received from other automated agents or systems.

Packet capture service 116 enables users 112 to provision (create) packet capture sessions in network 104 based on the tags created and assigned via tag management service 114. For example, packet capture service 116 can receive a user request to provision a packet capture session that specifies a tag as the packet capture source (i.e., where the packets will be captured from), a network element 106 comprising indexing agent 120 as the packet capture destination (i.e., where the captured packets will be stored), and a name for the packet capture session. In response, packet capture service 116 can fulfill the request by identifying the set of network device interfaces in network 104 that are associated with the specified tag (per the tag assignments maintained by tag management service 114), and sending, to each network device in network 104 with an interface in the identified set, a new device configuration that causes the network device to mirror packets from the device's tagged interfaces to the specified packet capture destination via a Layer 3 tunnel. In certain embodiments, each packet that is transmitted via this Layer 3 tunnel can include, in its tunnel protocol header, the packet capture session name and tag specified in the provisioning request. For example, if a Generic Routing Encapsulation (GRE) tunnel is used, the packet capture session name and tag can be included in the GRE key field of the GRE protocol header.

Indexing agent 120 enables the network element on which it runs to create search indexes on the mirrored packets that it receives from various interfaces in network 104 in accordance with the session name and tag information included in the packets' tunnel protocol headers. For example, indexing agent 120 can create one search index on the packet capture session name attribute and another search index on the tag attribute. Each of these search indexes is a data structure that facilitates and/or accelerates the querying of data (in this case, captured packets) using the indexed attribute.

Finally, packet query service 118 enables users 112 of NMS 102 to query for captured packet data using a packet capture session name and/or tag as query criteria. For example, packet capture service 118 can receive a user query for captured packets stored on a target network element 106, where the query specifies the tag "role: email" mentioned previously. In response, packet query service 118 can forward the query to the target network element, which can use the search indexes created by its indexing agent 120 to quickly find the captured packets stored thereon that match tag "role: email" and return those packets to service 118 for delivery to the requesting user.

With the high-level framework shown in FIG. 1 and described above, a number of advantages are realized. First, because the framework allows for the assignment of user-defined tags to sets of network device interfaces and the provisioning of packet capture sessions using these tags, in scenarios where a user commonly runs packet capture sessions against an interface set S, there is no need for the user to manually identify every interface in S for each such session, or to manually configure the network devices with interfaces in S to turn on mirroring to the packet capture destination. Instead, the user can simply create and assign a tag T to interface set S and thereafter specify T as the packet destination source for each packet capture session. In response, the framework can automatically identify the network device interfaces associated with tag T and propagate appropriate device configurations to the corresponding network devices to enable mirroring, thereby streamlining the packet capture process. As noted above, in some embodiments the tag assignments can be determined and updated by an automated agent, thereby ensuring that the set of network device interfaces associated with each tag are kept up-to-date in view of, e.g., application/service deployment changes in network 104.

Second, because the framework propagates session name/tag information for captured packets to the packet capture destinations and creates search indexes on these attributes at each destination, users can easily and efficiently query for the packet data that is of interest to them (e.g., all packets associated with a particular session name or tag). This is in contrast to existing query mechanisms, which generally limit users to searching for captured packets based on standard packet fields that often do not align with the intended/logical scope of the users' queries.

The remaining sections of this disclosure detail workflows that may be executed by framework components 114-120 in various embodiments, as well as an enhancement to the framework that can automatically trigger packet capture sessions in response to detected events. It should be appreciated that FIG. 1 and the foregoing description are illustrative and not intended to be limiting. For example, although the foregoing description focuses on the creation and use of user-defined tags to drive packet capture, in certain embodiments the framework can also enable users to provision packet capture sessions by simply specifying a list of network device interfaces (in addition to or in lieu of a tag). In other words, the framework of the present disclosure is not solely limited to supporting tag-based packet capture, and instead can support both interface-based and tag-based approaches. In embodiments where a user specifies a list of network device interfaces, the framework can still propagate the name of the packet capture session to the packet capture destination and enable querying of the captured packet data based on session name.

Further, although FIG. 1 depicts a particular arrangement of framework components within environment 100, other arrangements are possible. For example, the functionality attributed to a particular component may be split into multiple components, certain components may be combined, and so on.

2. Tag Creation and Assignment Workflow

Figure 2:
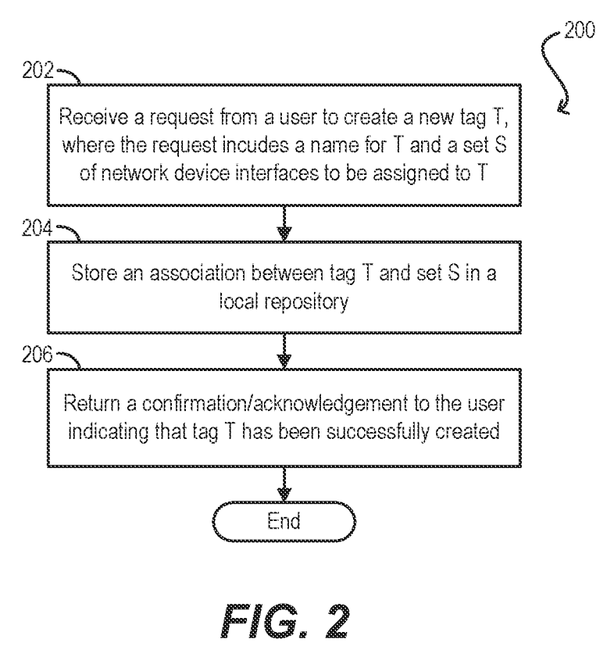
FIG. 2 depicts a tag creation and assignment workflow in accordance with certain embodiments of the present disclosure.

FIG. 2 depicts a workflow 200 that may be executed by tag management service 114 of NMS 102 for enabling a user 112 of the NMS to create a tag and assign the tag to a set of network device interfaces in network 104 according to certain embodiments.

Starting with step 202, tag management service 114 can receive a request from the user to create a new tag T, where the request includes a name for T and a set S of one or more network device interfaces in network 104 to be assigned to (or in other words, associated with) T. This request can be received via management UI 108 and/or management API 110 of NMS 102. In various embodiments, the interfaces in set S can share some common characteristic that is of interest for packet capture purposes and the tag name can reflect that common characteristic. For example, as mentioned previously, set S can include all network device interfaces connected to instances of an email service and the tag name can be "role: email." As another example, set S can include all network device interfaces that carry Dynamic Host Configuration Protocol (DHCP) traffic and the tag name can be "role: DHCP."

In one set of embodiments, the tag creation/assignment request received at step 202 can be submitted by a human user, such as administrator of network 104, that manually determines the network device interfaces included in set S. In other embodiments, the request can be submitted by an automated agent that makes this determination in a programmatic fashion. For example, if set S pertains to a particular application or service, the automated agent can automatically determine the interfaces in S based on information received from an application orchestration platform (e.g., Kubernetes or the like) that indicates where the platform has (or will) deploy instances of the application/service in network 104. In this scenario, the automated agent can also periodically submit follow-up requests to tag management service 114 to update the set S in view of dynamic changes to the application/service deployment (e.g., the addition of new instances or the removal of existing instances).

At step 204, tag management service 114 can store an association between tag T and its assigned interface set S in a local repository. Finally, tag management service 114 can return a confirmation/acknowledgment to the user indicating that tag T has been successfully created (step 206) and the workflow can end.

3. Packet Capture Session Provisioning and Search Index Creation Workflow

Figure 3:
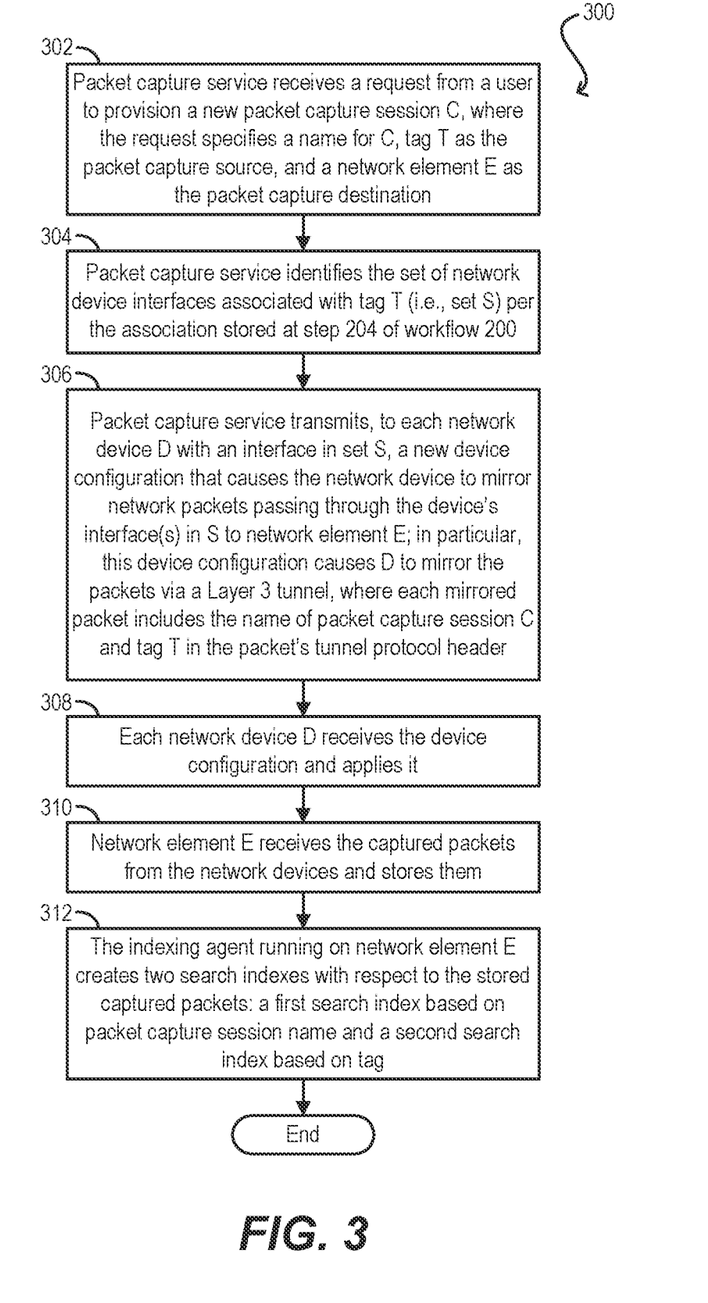
FIG. 3 depicts a packet capture session provisioning and search index creation workflow in accordance with certain embodiments of the present disclosure.

FIG. 3 depicts a workflow 300 that may be executed by packet capture service 116 of NMS 102 for enabling a user 112 of the NMS to provision a packet capture session based on tag T created via workflow 200 according to certain embodiments. Workflow 300 also includes steps that may be performed by the indexing agent 120 of the session's packet capture destination for creating search indexes on the session name and tag attributes of the packet data that is captured via the session.

Starting with step 302, packet capture service 116 can receive a request from the user to provision a new packet capture session C, where the request specifies a name for C, tag T as the packet capture source, and a network element E of network 104 as the packet capture destination. This request can be received via management UI 108 and/or management API 110 of NMS 102. Network element E can be, e.g., a recorder node or any other device in network 104 that implements indexing agent 120.

At step 304, packet capture service 116 can identify the network device interfaces associated with tag T (i.e., interface set S), per the association stored in the repository of tag management service 114 at step 204 of workflow 200. Packet capture service 116 can then transmit, to each network device D with an interface in set S, a new device configuration that causes the network device to mirror (copy) network packets passing through the device's interface(s) in S to network element E (i.e., the packet capture destination) (step 306). In particular, this device configuration can cause each network device D to mirror the packets to network element E via a Layer 3 tunnel, where each mirrored packet includes the name of packet capture session C and tag T in the packet's tunnel protocol header. For example, in one set of embodiments the Layer 3 tunnel can be a GRE tunnel and the session name and tag T can be included in a GRE key field of each packet's GRE protocol header. In some of these embodiments, the GRE key field (which is 32 bits long) can be formatted such that the first four bits are used to encode a particular format type indicating the presence of the session name and the tag (e.g., the bit string "0001"), the next twelve bits are used to encode the session name, and the last 16 bits are used to encode the tag.

At step 308, each network device D can receive the device configuration transmitted by packet capture service 116 and apply the configuration, thereby causing the network device to mirror packets passing through the device's interfaces in set S to network element E via a Layer 3 tunnel as described above. In response, network element E can receive and store the mirrored (captured) packets (step 310).

Finally, at step 312, indexing agent 120 running on network element E can create two search indexes with respect to the captured packets stored at step 310: a first search index based on the packet capture session name included in the tunnel protocol header and a second search index based on the tag (i.e., T) included in the tunnel protocol header.

4. Packet Query Workflow

Figure 4:
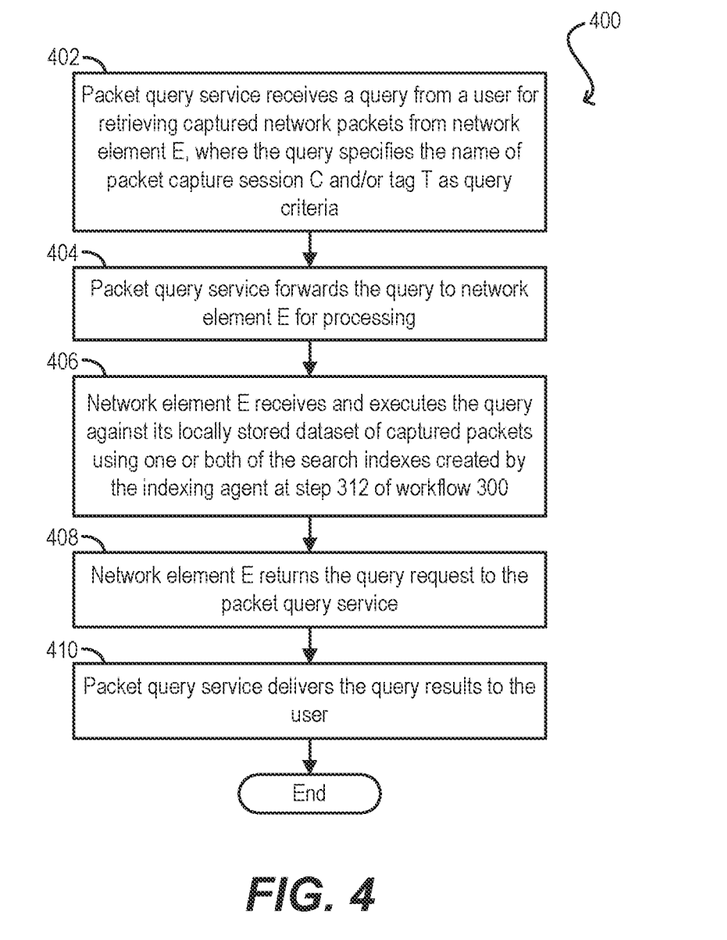
FIG. 4 depicts a packet query workflow in accordance with certain embodiments of the present disclosure.

FIG. 4 depicts a workflow 400 that may be executed by packet query service 118 of NMS 102 for enabling a user 112 of the NMS to query one or more network packets that are captured via packet capture session C provisioned via workflow 300 according to certain embodiments.

Starting with step 402, packet query service 118 can receive a query from a user for retrieving captured network packets from network element E (i.e., the packet capture destination of packet capture session C), where the query specifies the session name of C and/or tag T as query criteria. This request can be received via management UI 108 and/or management API 110 of NMS 102.

In response, packet query service 118 can forward the query to network element E for processing (step 404).

At step 406, network element E can receive and execute the query against its locally stored dataset of captured packets using one or both of the search indexes created by indexing agent 120 at step 312 of workflow 300. For example, if the query specifies the name of packet capture session C as a query criterion, the network element can execute the query using the search index created on the packet capture session name attribute. As another example, if the query specifies tag T as a query criterion, the network element can execute the query using the search index created on the tag attribute. As yet another example, if the query specifies both the name of session C and tag T as query criteria, the network element can execute the query using both search indexes.

Finally, network element E can return the query results (i.e., captured packets matching the query) to packet query service 118 (step 408) and service 118 can deliver the results to the user (step 410).

5. Event-Triggered Packet Capture

In some embodiments, the framework of the present disclosure can include a mechanism for automatically triggering a packet capture session on one or more network device interfaces in network 104 based on the detection of events pertaining to those interfaces (or pertaining to the network devices in which the interfaces reside). For example, one such event may be the increase of a network congestion metric on the interfaces above a predefined threshold. Another such event may be an increase of central processing unit (CPU) usage on the network devices above a predefined threshold.

In these embodiments, as part of submitting a request to provision a new packet capture session per workflow 300 of FIG. 3, a user 112 of NMS 102 can specify (in addition to the various pieces of information indicated at step 302) an event that will trigger the session, as well as a capture duration indicating the desired length of the session from the point of the event detection. In response, NMS 102 can monitor for the occurrence of the event within network 104. During this monitoring period, NMS 102 can hold off on transmitting new device configurations to the network devices with interfaces in set S per step 306 of workflow 300.

Upon detecting the event, packet capture service 116 can proceed with transmitting the new device configurations, thereby causing the network devices to mirror packets from their interfaces via a Layer 3 tunnel to the packet capture destination in accordance with step 308 of workflow 300, with the packet capture session name and tag T in the tunnel protocol header. In certain embodiments, these device configurations can specifically cause each network device to embed an identifier of the event in the packet capture session name included in the header. Finally, indexing agent 120 running at the packet capture destination can create search indexes based on the session name and tag attributes in accordance with step 310 of workflow 300, thereby allowing users to query the captured packets using these attributes. Because this event-triggered approach initiates the packet capture session at the time an event of interest is detected (rather than at the time the provisioning request is received), it advantageously increases the likelihood that the captured packet data will be useful to the requesting user. For example, this approach can help pinpoint issues that contribute to various problematic events such as network congestion events, network failure events, and so on.

6. Example Network Device

Figure 5:
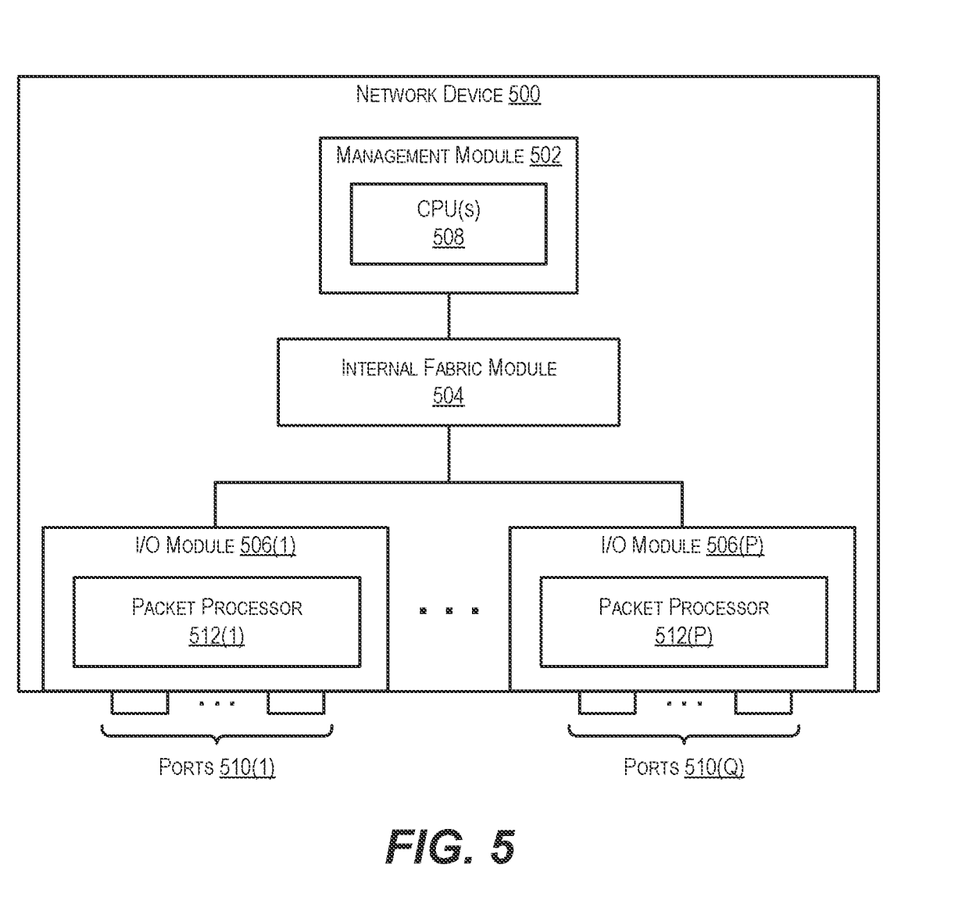
FIG. 5 depicts an example network device in accordance with certain embodiments of the present disclosure.

FIG. 5 depicts an example network device 500 according to certain embodiments of the present disclosure. Network device 500 may correspond to one or more of the network elements in network 104 of FIG. 1.

As shown in FIG. 5, network device 500 includes a management module 502, an internal fabric module 504, and a number of I/O modules 506(1)-(P). Management module 502 includes one or more management CPUs 508 for managing/controlling the operation of the device. Each management CPU 508 can be a general-purpose processor, such as an Intel/AMD x86 or ARM-based processor, that operates under the control of software stored in an associated memory (not shown). In certain embodiments, management CPU(s) 508 may run indexing agent 120 shown in FIG. 1.

Internal fabric module 504 and I/O modules 506(1)-(P) collectively represent the data, or forwarding, plane of network device 500. Internal fabric module 504 is configured to interconnect the various other modules of network device 500. Each I/O module 506 includes one or more input/output ports 510(1)-(Q) that are used by network device 500 to send and receive network packets. Each I/O module 506(1)-(P) can also include a packet processor 512 that is configured to make wire speed decisions on how to handle incoming or outgoing network packets.

It should be appreciated that network device 500 is illustrative and many other configurations having more or fewer components than network device 500 are possible.

7. Example Computer System

Figure 6:
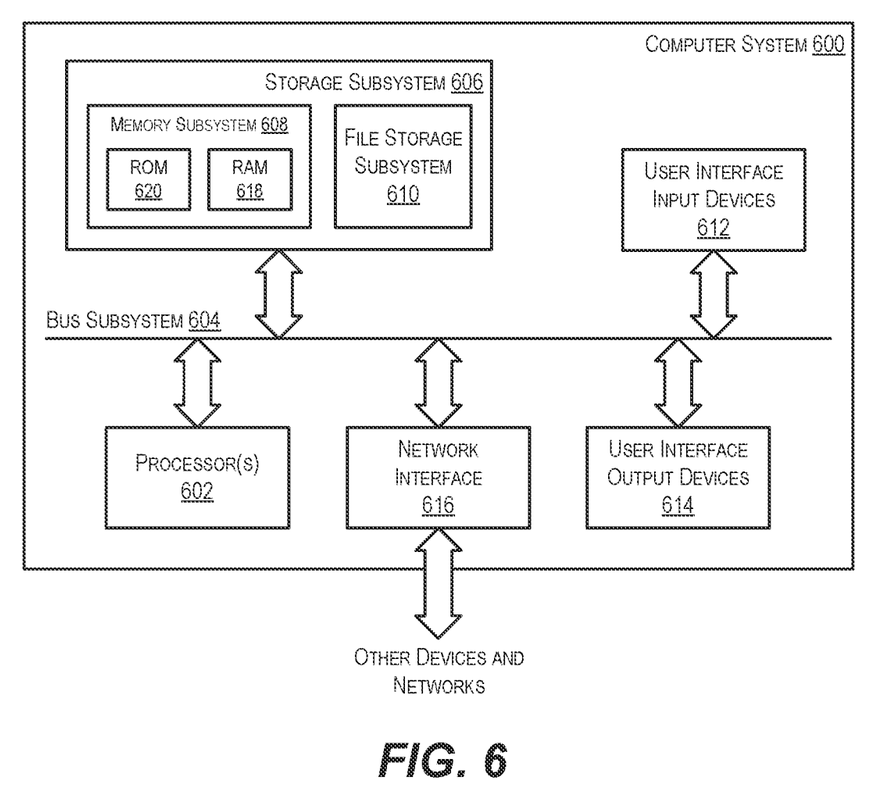
FIG. 6 depicts an example computer system in accordance with certain embodiments of the present disclosure.

FIG. 6 depicts an example computer system 600 according to certain embodiments of the present disclosure. Computer system 600 (or a cluster of such systems) may be used to run some or all of the framework components shown in FIG. 1, including tag management service 114, packet capture service 116, packet query service 118, and/or indexing agent 120.

As shown in FIG. 6, computer system 600 includes one or more CPUs 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem can utilize multiple buses.

Network interface subsystem 616 serves as an interface for communicating data between computer system 600 and other computing devices or networks. Embodiments of network interface subsystem 616 can include wired (e.g., coaxial, twisted pair, or fiber optic) and/or wireless (e.g., Wi-Fi, cellular, Bluetooth, etc.) interfaces.

User interface input devices 612 can include a keyboard, pointing devices (e.g., mouse, trackball, touchpad, etc.), a scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 600.

User interface output devices 614 can include a display subsystem such as a flat-panel display or non-visual displays such as audio output devices, etc. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store, in a non-transitory state, program code and/or data that provide the functionality of various embodiments described herein.

Memory subsystem 608 includes a number of memories including a main random-access memory (RAM) 618 for storage of instructions and data during program execution and a read-only memory (ROM) 620 in which fixed instructions may be stored. File storage subsystem 610 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than computer system 600 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network management system (NMS), the method comprising:
   storing an association between a set of network device interfaces in a network managed by the NMS and a tag;
   receiving a request to provision a packet capture session in the network, the request specifying a name of the packet capture session, the tag as a packet capture source, and a network element in the network as a packet capture destination; and
   in response to the request:
      identifying the set of network device interfaces associated with the tag using the stored association; and
      transmitting, to each network device that has an interface in the set of network device interfaces, a device configuration that causes the network device to mirror network packets from the interface to the network element via a Layer 3 tunnel, wherein each network packet mirrored via the Layer 3 tunnel includes the name of the packet capture session and the tag in a tunnel protocol header of the network packet.

2. The method of claim 1 wherein the set of network device interfaces share a common attribute.

3. The method of claim 1 wherein the set of network device interfaces carry network traffic sent and received by an application deployed in the network.

4. The method of claim 3 wherein the tag is created by an agent that automatically determines the set of network device interfaces using information received from an application orchestration platform that indicates where instances of the application are deployed.

5. The method of claim 1 wherein the Layer 3 tunnel is a Generic Routing Encapsulation (GRE) tunnel and the tunnel protocol header is a GRE protocol header.

6. The method of claim 5 wherein the name of the packet capture session and the tag are included in a GRE key field of the GRE protocol header.

7. The method of claim 6 wherein a first four bits of the GRE key field encode a format type, a next twelve bits of the GRE key field encode the name of the packet capture session, and a next sixteen bits of the GRE key field encode the tag.

8. The method of claim 1 wherein the network element:
   receives the mirrored network packets from said each network device;
   creates a first search index with respect to the received packets based on the name of the packet capture session; and
   creates a second search index with respect to the received packets based on the tag.

9. The method of claim 8 further comprising:
   receiving a request to query network packets stored on the network element, the request specifying the name of the packet capture session and/or the tag; and
   forwarding the request to the network element, wherein the network element executes the query using the first search index and/or the second search index.

10. The method of claim 1 wherein the request further specifies an event in the network for triggering initiation of the packet capture session.

11. The method of claim 10 further comprising, in response to receiving the request:
    monitoring for occurrence of the event; and
    upon detecting the event, transmitting the device configuration to said each network device.

12. The method of claim 11 wherein the name of the packet capture session included in the tunnel protocol header includes an identifier of the event.

13. A computer system implementing a network management system (NMS), the computer system comprising:
    a processor; and
    a computer-readable storage medium having stored thereon program code that, when executed by the processor, causes the processor to:
       store an association between a set of network device interfaces in a network managed by the NMS and a tag;
       receive a request to provision a packet capture session in the network, the request specifying a name of the packet capture session, the tag as a packet capture source, and a network element in the network as a packet capture destination; and
       in response to the request:
          identify the set of network device interfaces associated with the tag using the stored association; and
          transmit, to each network device that has an interface in the set of network device interfaces, a device configuration that causes the network device to mirror network packets from the interface to the network element via a Layer 3 tunnel, wherein each network packet mirrored via the Layer 3 tunnel includes the name of the packet capture session and the tag in a tunnel protocol header of the network packet.

14. The computer system of claim 13 wherein the set of network device interfaces carry network traffic sent and received by an application deployed in the network, and wherein the tag is created by an agent that automatically determines the set of network device interfaces using information received from an application orchestration platform that indicates where instances of the application are deployed.

15. The computer system of claim 13 wherein the network element is a recorder node in the network.

16. The computer system of claim 13 wherein the Layer 3 tunnel is a Generic Routing Encapsulation (GRE) tunnel, wherein the tunnel protocol header is a GRE protocol header, and wherein the name of the packet capture session and the tag are included in a GRE key field of the GRE protocol header.

17. The computer system of claim 16 wherein a first four bits of the GRE key field encode a bit string 0001, a next twelve bits of the GRE key field encode the name of the packet capture session, and a next sixteen bits of the GRE key field encode the tag.

18. A method comprising:
receiving, by a network management system (NMS), a request to provision a packet capture session in a network, the request specifying a name of the packet capture session, a list of network interfaces in the network as a packet capture source, and a network element in the network as a packet capture destination; and transmitting, by the NMS, to each network device that has an interface in the list of network device interfaces, a device configuration that causes the network device to mirror network packets from the interface to the network element via a Layer 3 tunnel, wherein each network packet mirrored via the Layer 3 tunnel includes the name of the packet capture session in a tunnel protocol header of the network packet.

19. The method of claim 18 wherein the request further specifies an event in the network for triggering initiation of the packet capture session, and wherein the NMS delays transmission of the device configuration to said each network device until the event is detected.

20. The method of claim 18 wherein the name of the packet capture session included in the tunnel protocol header includes an identifier of the event.

* * * * *